(12) United States Patent
He et al.

(10) Patent No.: US 8,611,665 B2
(45) Date of Patent: Dec. 17, 2013

(54) METHOD OF RECOGNIZING A MEDIA ITEM

(75) Inventors: Chao He, Broughty Ferry (GB); Gary A. Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 1198 days.

(21) Appl. No.: 11/888,684

(22) Filed: Aug. 2, 2007

(65) Prior Publication Data

US 2008/0123931 A1 May 29, 2008

Related U.S. Application Data

(60) Provisional application No. 60/877,724, filed on Dec. 29, 2006.

(51) Int. Cl.
*G06K 9/46* (2006.01)

(52) U.S. Cl.
USPC .......................................... 382/190; 382/181

(58) Field of Classification Search
USPC .................. 382/135, 140, 224, 228, 190, 208
See application file for complete search history.

(56) References Cited

U.S. PATENT DOCUMENTS

| | | | |
|---|---|---|---|
| 5,729,623 A | 3/1998 | Omatu et al. | |
| 6,163,618 A | 12/2000 | Mukai | |
| 6,690,824 B1 * | 2/2004 | Stringa | 382/176 |
| 6,785,405 B2 * | 8/2004 | Tuttle et al. | 382/112 |
| 2002/0034330 A1 * | 3/2002 | Lennon et al. | 382/228 |
| 2003/0021459 A1 | 1/2003 | Neri et al. | |
| 2003/0081824 A1 * | 5/2003 | Mennie et al. | 382/135 |
| 2003/0217906 A1 | 11/2003 | Baudat et al. | |
| 2004/0183923 A1 | 9/2004 | Dalrymple | |
| 2004/0247169 A1 * | 12/2004 | Ross et al. | 382/137 |
| 2006/0017959 A1 * | 1/2006 | Downer et al. | 358/1.14 |
| 2007/0217661 A1 * | 9/2007 | Massoud | 382/119 |
| 2010/0158362 A1 * | 6/2010 | Lang et al. | 382/165 |

FOREIGN PATENT DOCUMENTS

| | | |
|---|---|---|
| EP | 1 484 719 A2 | 12/2004 |
| EP | 1 217 589 B1 | 2/2007 |

OTHER PUBLICATIONS

Frosini et al., "A Neural Network-Based Model for Paper Currency Recognition and Verification", IEEE Transactions on Neural Networks, 1966.
Kosaka et al., "Bill Classification by Using the LVQ Method", 2001 IEEE International Conference on System, Man and Cybernetics, 2001 (Glory).
Ahmadi et al., "A Study on Evaluating and Improving the Reliability of Bank Note Neuro-Classifiers", SICE Annual Conference in Fukui, Aug. 2003 (Glory).
Ahmadi et al., "A Reliable Method for Classification of Bank Notes Using Artificial Neural Networks", Artificial Life and Robotics, 2004 (Glory).
He C et al., "Employing optimized combinations of on-class classifiers for automated currency validation", Pattern Recognition, Elsevier, Kidlington, GB, vol. 37, No. 6, Jun. 2004, pp. 1085-1096, XP004505313, ISSN: 0031-3203.

\* cited by examiner

*Primary Examiner* — Edward Park
(74) *Attorney, Agent, or Firm* — Peter H. Priest

(57) ABSTRACT

A technique for use in automated recognition of a media item involves accessing a template that includes multiple segmentation maps that each is associated with one of multiple classes to which the media item might belong. For each of the multiple classes, the segmentation map is applied to an image of the media item to extract a feature set for the image, the feature set is analyzed, and an assessment is made as to whether the media item belongs to the class.

16 Claims, 5 Drawing Sheets

FIG. 1
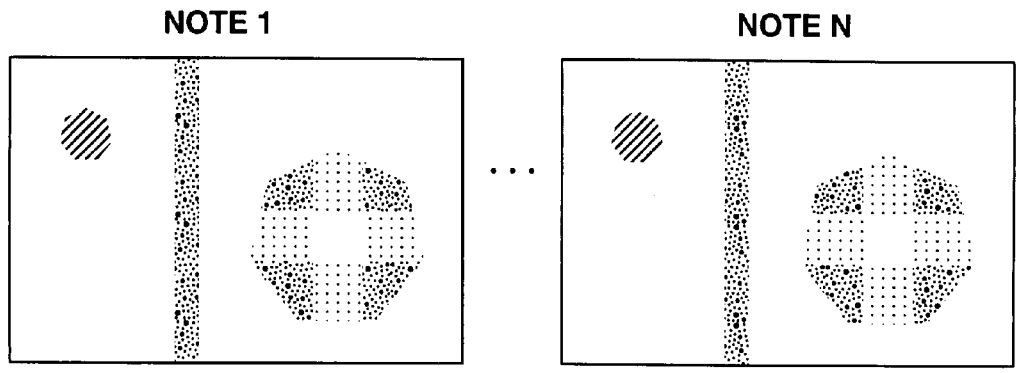
FIG. 2
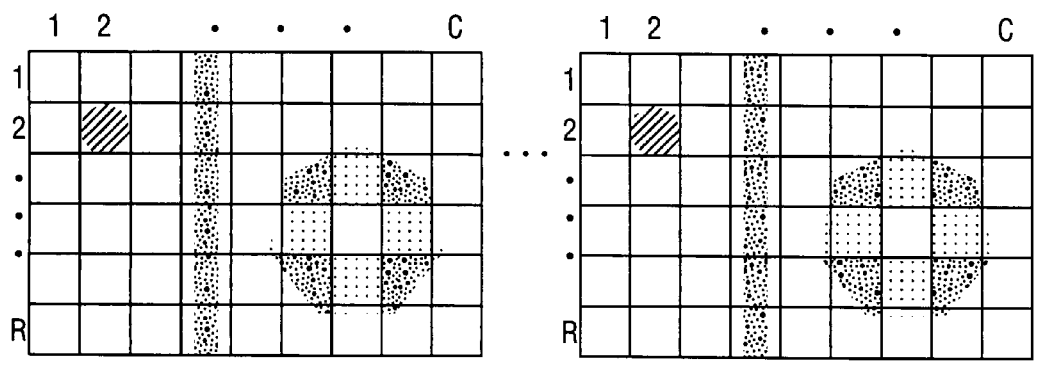
FIG. 3
| $P^1_{11}$ | $P^1_{12}$ | ... | $P^1_{1C}$ | $P^1_{21}$ | ... | $P^1_{2C}$ | ... | $P^1_{R1}$ | ... | $P^1_{RC}$ |
|---|---|---|---|---|---|---|---|---|---|---|
| $P^2_{11}$ | | | | | ... | | | | | $P^2_{RC}$ |
| | | | | | | | | | | |
| | | | | ⋮ | | | | | | ⋮ |
| | | | | | | | | | | |
| $P^N_{11}$ | | | | | ... | | | | | $P^N_{RC}$ |

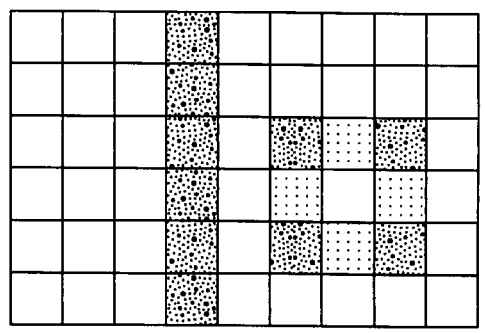

METHOD OF RECOGNIZING A MEDIA ITEM

CROSS-REFERENCE TO RELATED APPLICATIONS

This application claims priority from U.S. Provisional Application 60/877,724, filed by Chao He and Gary Ross on Dec. 29, 2006. It is related to U.S. application Ser. No. 11/305,537, titled "Banknote Validation" and filed by Chao He and Gary Ross on Dec. 16, 2005, and to U.S. application Ser. No. 11/366,147, also titled "Banknote Validation" and filed by Chao He and Gary Ross on Mar. 2, 2006.

BACKGROUND

The banking industry is seeing a move toward "bunch deposits" at self-service terminals (SSTs), such as automated teller machines (ATMs). The "bunch deposit" allows the banking customer to insert multiple valuable media items (e.g., bank notes and paper checks) into an SST all at once for deposit to a financial account. During a bunch deposit, the SST separates the items in the bunch, creates one or more images of each of the items, and analyzes the images to assess the validity of the items. In some cases, the SST also displays the images of the items to the customer so that the customer can confirm that the items are properly credited to the customer's account.

For valuable items such as bank notes, the SST must recognize each of the items (e.g., its currency and denomination) before it can validate the item. In most systems, recognition is complicated by the large number of bank notes that can be deposited (e.g., $1, $5, $10, $20, $50 and $100 denominations in the United States), as well as the fact that each note can be inserted into the SST with any of four possible orientations. The SST must be able to recognize every bank note, both valid and counterfeit, regardless of its denomination and its orientation upon insertion.

Up to now, traditional note recognition techniques require currency templates that are extremely labor intensive to create. Creating these templates requires a great deal of human involvement in selecting key features of each bank note in every possible orientation. Each time a new bank note is released or changes are made to an existing note, the currency templates must be updated in the SST, again requiring the expertise of humans trained in identifying key features of the notes.

SUMMARY

Described below is a technique for use in automated recognition of a media item. The technique involves accessing a template that includes multiple segmentation maps that each is associated with one of multiple classes to which the media item might belong. For each of the multiple classes, the segmentation map is applied to an image of the media item to extract a feature set for the image, the feature set is analyzed, and an assessment is made as to whether the media item belongs to the class.

Also described is a technique for use in creating a template for automated recognition of media items. The technique involves receiving images of multiple media items, where each of the images belongs to one of multiple classes. For each of the multiple classes, the images belonging to that class are used to create a segmentation map for the class, the segmentation map is applied to at least one of the images to extract a feature set for the class, and one or more mathematical values is calculated from the feature set. The technique also includes defining the template to include the segmentation map and the one or more mathematical values for each of the multiple classes.

Other features and advantages will become apparent from the description and claims that follow.

BRIEF DESCRIPTION OF THE DRAWINGS

FIGS. 1, 2, 3, 4, 5 and 6 together illustrate a process for creating a segmentation map and a feature set matrix for a class of media items.

DETAILED DESCRIPTION

Figure 7:
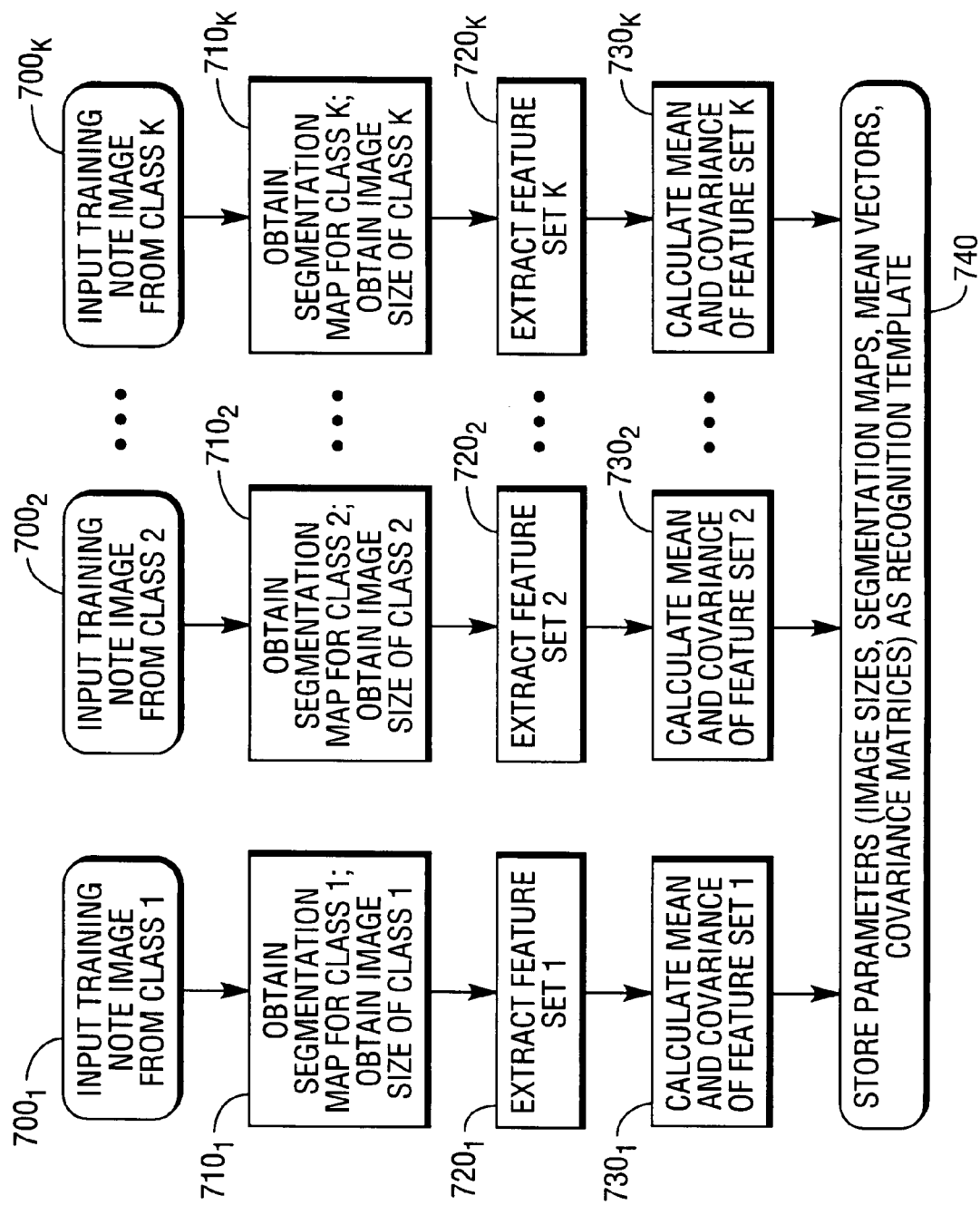
FIG. 7 is a flow diagram showing a process for creating a template for automated recognition of media items belonging to multiple media classes.

Described below is a technique for use in creating automated media-recognition templates and then using these templates in systems that accept any form of valuable media from users of those systems. The technique is particularly useful in automated recognition of bank notes in any type of self-service terminal configured to receive bank notes, including automated teller machines (ATMs) with note-deposit capabilities, ticket vending machines, currency-exchange machines, self-service kiosks, and the like. The description below concentrates most heavily on the recognition of bank notes, but the techniques are useful in the automated recognition of virtually any type of valuable media.

The technique for creating media-recognition templates draws upon the principles described in the two related non-provisional applications referenced above. Those applications describe the creation of a one-class classifier for use in automated assessment of the validity of a bank note or other valuable media, using a currency template that is built upon a statistical representation of the sub-regions of one or more genuine bank notes, and only genuine bank notes—no statistical representation of counterfeit bank notes is necessary. In other words, the classifier created for banknote validation is a "one-class" classifier in that, in determining the validity of each note, it requires statistical information from genuine notes only and, with this information, concludes either that the note in question does belong to the class (i.e., is "genuine") or does not belong to the class (i.e., is counterfeit).

In general, each note "class" is defined by a particular combination of currency (e.g., U.S. Dollars), denomination (e.g., $5, $10, $20 denominations), series (e.g., a 2003 $5 bill vs. a 2006 $5 bill), and orientation (i.e., front-side right edge first, front-side left edge first, back-side right edge first, back-side left edge first). For a currency having two different denominations of bills, each having been produced under two different series, the currency would have sixteen different classes (2 denominations×2 series×4 orientations=16 classes). The media-recognition process described below is designed to recognize automatically that a valuable media item belongs to one of multiple possible classes.

As shown in FIG. 1, the process for creating a media-recognition template involves capturing images of multiple bank notes (Notes 1 to N) for each note class. The images are generated in any of multiple possible image "channels," each representing either the transmission or reflection characteristics of the bank notes when illuminated at a selected frequency or range of frequencies—e.g., red, green, blue, infrared and ultraviolet. As shown in FIG. 2, the images of the notes in each class have an image size determined by the number of pixels contained in each image—an image that is R pixels high and C pixels wide has an image size of RxC.

Each of the pixels in an image has an intensity value P which is easily measured using known techniques. For an image set of N notes have RxC pixels each, the pixel intensity value at the $i^{th}$ row and the $j^{th}$ column of the $n^{th}$ note is represented as $P_{ij}^n$, where i=1, 2, ..., R; j=1, 2, ..., C; and n=1, 2, ..., N. Representing intensity values of the pixels in this manner allows for the creation of an image-intensity matrix like that shown in FIG. 3. In this matrix, the intensity values for all pixels in the image of the first note are aligned in the first row; the intensity values for all pixels in the image of the second note are aligned in the second row; and so on, with intensity values for all pixels in the image of the $N^{th}$ note aligned in the $N^{th}$ row. The result is that the columns of the matrix provide a "pixel-position profile" for all of the images in the class—i.e., each column indicates the intensity values for all pixels in a given position across all of the notes in the class. For example, in the example of FIG. 3, the first column of the matrix indicates the image intensities for all pixels in the first row and first column (upper left corner) of the note images; the last column of the matrix indicates the image intensities for all pixels in the $R^{th}$ row and $C^{th}$ column (lower right corner) of the note images.

A clustering algorithm is then applied to the image-intensity matrix to group the pixel positions into M subgroups, or "segments." To accomplish this, a similarity measure is calculated for every pair of pixel positions using the intensity values for the pixels in each pair, e.g., by calculating the Euclidean distance between column vectors in the matrix. This clustering process takes place in an iterative manner, and, after the results of the algorithm have converged around the M segments, every pixel position is assigned a "membership index" indicating to which of the M segments it belongs. The set of membership-index values across the entire RxC image size form a "segmentation map" for the note class.

FIG. 4 shows a segmentation map for the example of FIGS. 1 and 2 in which the notes are divided into three segments (M=3). Each pixel position in the map is has a numerical value of "1," "2" or "3," where a value of "1" represents very dark pixels, a value of "3" represents very light pixels, and a value of "2" represents pixels that are somewhere between light and dark. This segmentation map applies to all N of the notes in the training set for the note class and, in some systems, is used in the recognition and validation processes with images taken from any and all of the available image channels.

Once the segmentation map has been created for the note class, the map is applied as a mask to extract discriminative information from each of the N images in the class, as shown in FIG. 5. Applying the segmentation map to the image of note n allows for calculation of the average (or mean) intensity value $S_m^n$ for all pixels in the image that belong to each of the M segments, where m=1, 2, ..., M; and n=1, 2, ..., N. In the example of FIG. 5, applying the segmentation map creates, for each note, three mean intensity values—$S_1$, $S_2$, and $S_3$—one for each of the three segments defined in the segmentation map.

The mean-intensity values for all of the N notes in the training set are then combined to create a "feature set matrix" F for the note class, as shown in FIG. 6. Each row in the matrix holds the mean intensity values for the M segments of a single one of the notes in the training set. In the example here, the feature set matrix is an N×3 matrix—N notes each having three segments. The feature set matrix for each training set (one for each note class) is then used as described below to create an automated recognition template for use in self-service terminals.

FIG. 7 shows a process for use in creating an automated recognition template for multiple media classes, using the principles described above in a system (the "training system") configured for template creation. The process involves inputting a set of training images into the training system for each of K media classes (steps $700_{1-K}$). The training images may be captured at the training system itself, or they may be captured elsewhere and delivered to the training system through a network or through some tangible storage medium, such as a CD-ROM. For each media class, the set of training images can include any number of images, and the sets for no two classes need contain the same number of images. In the end, the number of training images for each media class will be chosen by the entity responsible for creating the recognition template.

Once the training images are loaded into the training system, the training system obtains the image size and creates a segmentation map for each media class (steps $710_{1-K}$). The training system then applies, for each media class, the segmentation map to the set of training images to create a feature set matrix for the media class (steps $720_{1-K}$). The training system then calculates a mean vector and a covariance matrix for each of the feature set matrices (steps $730_{1-K}$). The formulas for deriving mean vectors and covariance matrices are well known in the art and are not described in any detail here.

When the training system has found the mean vectors and covariance matrices for all of the K media classes, it creates and stores an automated recognition template for use with media items in all K classes (step 740). The recognition template includes, for each media class, the image size, the segmentation map, the mean vector, and the covariance matrix. The recognition template is distributed to media-handling systems for use in recognizing media items when those items are inserted into the systems.

Figure 8:
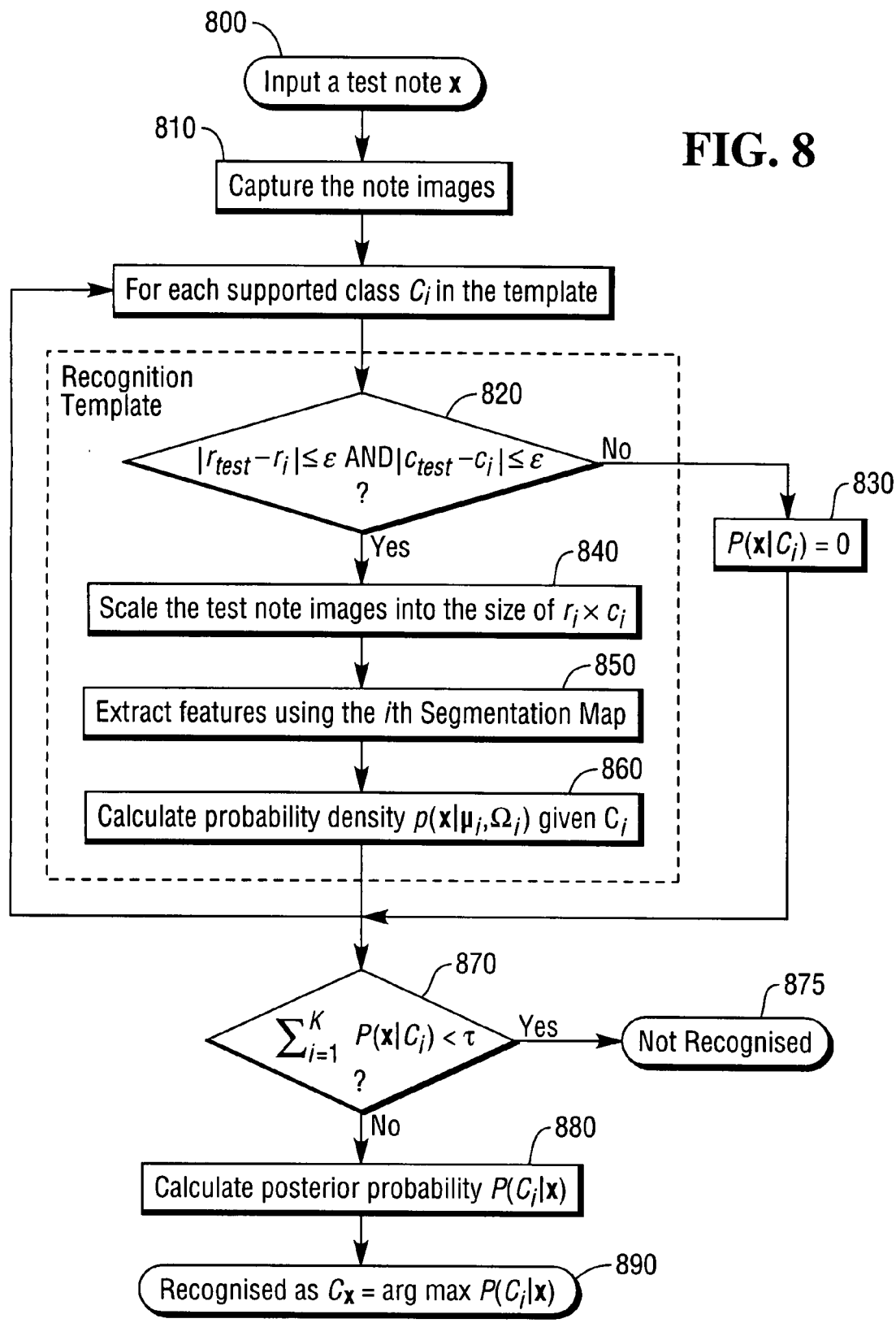
FIG. 8 is a flow diagram showing a process for automated recognition of media items belonging to multiple media classes.

FIG. 8 shows a process for automated recognition of a valuable media item, such as a bank note, that is inserted into a media-handling system, such as a self-service terminal. This process assumes that images of media items belonging to a particular media class are Gaussian distributed $N(\mu,\Omega)$ and thus that the probability density of a given test item x under the $i^{th}$ media class $C_i$ is found by the following formula:

$$p(x \mid C_i) = p(x \mid \mu_i, \Omega_i)$$
$$= \frac{1}{(2\pi)d/2|\Omega_i|1/2} \exp\left(-\frac{1}{2}(x-\mu_i)^T \Omega_i^{-1} (x-\mu_i)\right).$$

According to Bayesian classification theory, calculating the posterior probability $P(C_i|x)$, i=1, 2 ..., K allows for prediction of the class to which the test item x belongs, using the Bayesian rule:

$$P(C_i \mid x) = \frac{p(x \mid C_i)P(C_i)}{p(x)}$$
$$= \frac{p(x \mid C_i)P(C_i)}{\sum_{i=1}^{K} p(x \mid C_i)P(C_i)}.$$

By assuming that each media class has equal probability (i.e., that $P(C_i)=P(C)$ $\forall i=1, 2, \ldots, K$), the equation above becomes:

$$P(C_i \mid x) = \frac{p(x \mid C_i)}{\sum_{i=1}^{K} p(x \mid C_i)}.$$

Using this equation with the first equation above allows for calculation of the posterior probability of the test item x under each media class. The test item x can then be assigned to the media class that has the largest posterior probability:

$$C_x = \arg\max P(C_i \mid x), i=1, 2, \ldots K$$

A posterior probability of zero (i.e., $P(C_i \mid x)=0$) indicates that the test item x is not supported or recognized by the media class $C_i$.

With this in mind, the process for automatic recognition of a media item, such as a bank note, begins when the item is inserted into a media-handling system (step 800). Upon receiving the item, the system generates one or more digital images of the item using any one of multiple image channels, like those described above (step 810). The system then puts the image(s) of the test item (the "test image") through the automated recognition process.

For each of the K media classes supported by the recognition template, the system first determines whether the image size $r_{test} \times c_{test}$ of the test image is sufficiently close to the standard image size $r_i \times c_i$ for that media class (step 820), using the formulas $|r_{test} - r_i| \le \epsilon$ and $|c_{test} - c_i| \le \epsilon$, where $\epsilon > 0$ is a small, predefined constant. If the image size of the test image differs from the standard image size by too great an amount, the system concludes that the test item cannot belong to that media class and assigns a value of zero to the item's probability under this class—$P(x \mid C_i)=0$ (step 830). The system then moves on to the next media class supported by the template. If, on the other hand, the test image is sufficiently close to the standard image size for the media class, the system concludes that the test item could belong to the media class and continues the recognition process by scaling the test image to the standard image size $r_i \times c_i$ for continued processing (step 840).

At this point, the system retrieves the segmentation map for the media class and applies it to the test image to create a feature set vector (step 850). The system then applies the formulas above to calculate the probability density for the test item under the media class (step 860). After calculating the probability density for the media class, the system repeats the steps above for all other media classes supported by the recognition template to find the probability densities for the test item under those media classes as well.

Once the system has found the probability densities for the test item under all of the supported media classes, it calculates the likelihood that the test item belongs to any of the supported media classes using the summation formula $$\sum_{i=1}^{K} P(x \mid C_i) < \tau,$$

where $r>0$ is a small, predefined constant (step 870). If the resulting sum is too small, the system concludes that the test item cannot be recognized and ends the recognition process (step 875). If, on the other hand, the system concludes that the test item does indeed belong to one of the supported media classes, the system calculates, for each media class, the posterior probability that the test item belongs to that class (step 880). The system then decides which of the posterior probability values is greatest (step 890) and concludes that the test item belongs to the corresponding media class.

Figure 9:
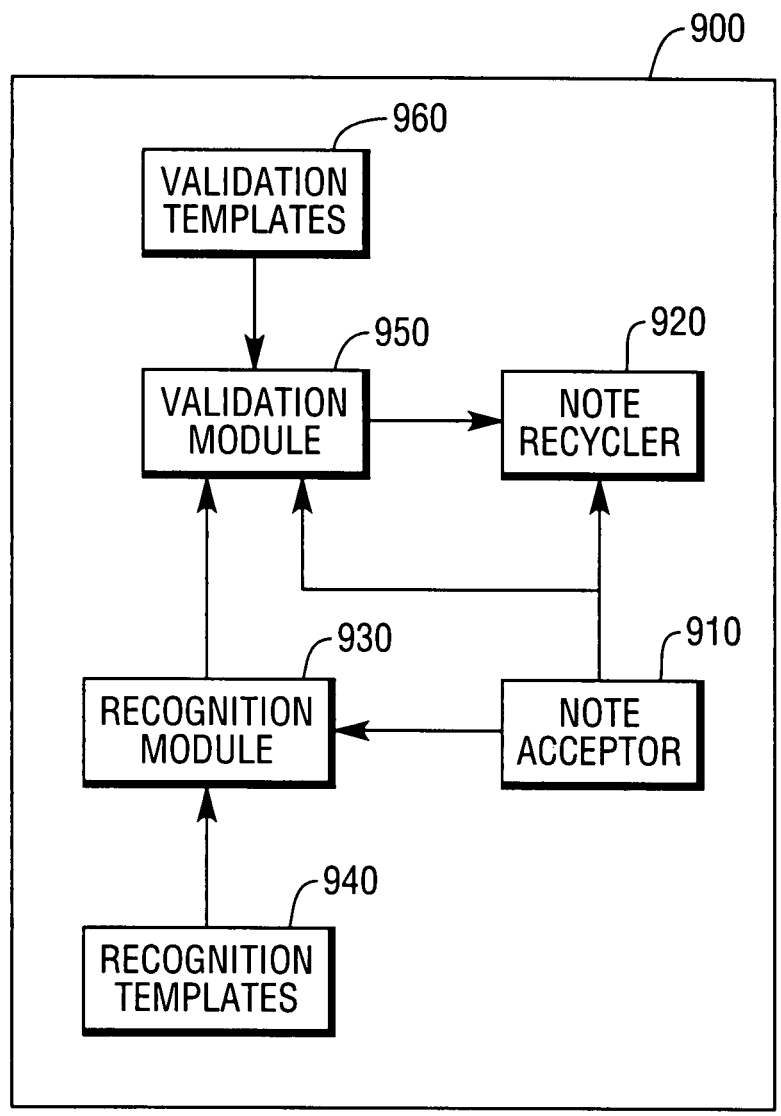
FIG. 9 is a diagram showing a system that implements an automated recognition process like that shown in FIG. 8.

FIG. 9 shows a system 900, such as an automated teller machine (ATM) or currency recycler, that employs the automated recognition process described above when accepting valuable media items, such as bank notes or paper checks. In this example, the system is described in terms of currency recycling. The system 900 includes a note-acceptor module 910 that receives one or more notes from a user of the system and generates images of the notes. The note-acceptor module 910 passes the received notes to a note-recycler module 920, which holds each of the notes in limbo until it has received an instruction either to accept the note as valid or to reject is as invalid, as described below.

The note acceptor-module 910 delivers the images of the notes it receives to a recognition module 930. The recognition module 930 retrieves a recognition template 940 like that described above from a pre-selected storage location and applies the template to the note images in an attempt to recognize the notes. If the recognition module is not able to recognize a note, it sends an instruction to the note-recycler module 920 to return the note to the user. If the recognition module does recognize the note, however, it delivers a "note identification" (or "Note ID") message to a validation module 950 to identify the note class to which the note belongs.

Like the recognition module 930, the validation module 950 receives images of each note from the note-acceptor module 910. Using note-class information contained in the "Note ID" message it receives from the recognition module 930, the validation module 950 retrieves a note-validation template 960 for the note class to which the note belongs. The validation module 950 applies the note-validation template 960 to the note images to assess whether the note is valid. If the note is valid, the validation module 950 instructs the note-recycler module 920 to accept the note. If validation module 950 concludes that the note is invalid, it instructs the note-recycler module 920 to reject the note, either by returning the note to the user or by diverting the note to a "rejected notes" bin.

Computer-Based and Other Implementations

The various implementations of the systems and processes described above are typically realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. Many other embodiments are also within the scope of the following claims.

We claim:

1. A method for use in automated recognition of a media item, the method comprising:

storing in a digital memory a template that comprises multiple segmentation maps, wherein each of the segmentation maps is associated with one of multiple classes to which the media item might belong, wherein each of the segmentation maps includes segments defining one or more different features of a corresponding class, and where each of the segments is defined by clustering pixels utilizing measured intensity values of the pixels;

accessing by a computer the template; and for each of the multiple classes:

applying by the computer the segmentation map of the class to an image of the media item to extract a feature set for the image; and analyzing by the computer the feature set including comparing the features to the feature set and assessing whether the media item belongs to the class.

2. The method of claim 1, further comprising concluding that the media item belongs to none of the multiple classes and, in response, concluding that the media item is not recognized.

3. The method of claim 1, further comprising concluding that the media item belongs to one of the multiple classes and, in response, recognizing that the media item is a member of that class.

4. The method of claim 1, further comprising, for each of the multiple classes, before applying the segmentation map:

retrieving from the template information indicating a standard image size for a media item belonging to that class; and assessing whether the image of the media item lies within a predefined margin-of-error of the standard image size.

5. The method of claim 4, further comprising concluding that the image of the media item lies outside the predefined margin-of-error of the standard image size for that class and, in response, concluding that the media item is not a member of that class.

6. The method of claim 4, further comprising:

concluding that the image of the media item lies within the predefined margin-of-error of the standard image size for that class; and thereafter scaling the image of the media item to have exactly the standard image size for that class.

7. The method of claim 1, where, for each of the multiple classes, assessing whether the media item belongs to the class includes applying the template to the feature set to calculate probability density of the media item for that class.

8. The method of claim 7, further comprising, for each of the multiple classes, using the probability density to calculate a posterior probability that the media item belongs to the class.

9. The method of claim 8, where, for each of the multiple classes, assessing whether the media item belongs to the class includes:

identifying one of the multiple classes for which the posterior probability is greatest;

concluding that the media item belongs to that class; and concluding that the media item belongs to none of the other classes.

10. The method of claim 1, where the media item is a bank note.

11. The method of claim 10, where each of the classes corresponds to a particular currency, a particular denomination, and a particular production series to which the bank note belongs and to one of multiple orientations in which the bank note can be inserted into an automated recognition machine.

12. The method of claim 11, wherein mean intensity values of all bank notes in a training set of N bank notes were combined to create a feature set matrix for each of the classes.

13. The method of claim 12 wherein the bank notes comprise a particular denomination and series of U.S. currency.

14. The method of claim 1 wherein clustering pixels utilizing measured intensity values of the pixels is performed by clustering all pixels having sufficiently similar measured intensity values.

15. The method of claim 14 further comprising:

determining a mean intensity value for all pixels that belong to each of said segments.

16. The method of claim 1 wherein at least one of said segments comprises multiple non-contiguous areas.

* * * * *